(12) United States Patent
Yu

(10) Patent No.: US 6,684,554 B2
(45) Date of Patent: *Feb. 3, 2004

(54) HAND NET FRAME

(76) Inventor: Kuo-Pin Yu, No. 6, Lane 477, Sec. 2, Feng-shyn Rd., Feng Yuan City, Taichung Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/963,400

(22) Filed: Sep. 27, 2001

(65) Prior Publication Data

US 2003/0056420 A1 Mar. 27, 2003

(51) Int. Cl.⁷ .............................................. A01K 77/00
(52) U.S. Cl. ................................................... 43/7; 43/7
(58) Field of Search ............................ 43/7, 107, 133, 43/11, 12

(56) References Cited

U.S. PATENT DOCUMENTS

| | | | | |
|---|---|---|---|---|
| 2,486,163 A | * | 10/1949 | Jennings et al. ................ | 43/11 |
| 2,626,804 A | * | 1/1953 | Robinson ..................... | 473/534 |
| 3,640,533 A | * | 2/1972 | Davis et al. ........... | 273/DIG. 7 |
| 3,949,988 A | * | 4/1976 | Staufer ........................ | 264/314 |
| 4,098,505 A | * | 7/1978 | Thompson .................. | 156/245 |
| 4,264,389 A | * | 4/1981 | Staub et al. ................. | 156/156 |
| 4,283,050 A | * | 8/1981 | Nagamoto .................. | 473/535 |
| 4,579,343 A | * | 4/1986 | Mortvedt ............. | 273/DIG. 23 |
| 4,643,857 A | * | 2/1987 | Cousin et al. ............... | 264/148 |
| 5,174,568 A | * | 12/1992 | You ............................ | 473/521 |
| 5,273,279 A | * | 12/1993 | You ............................ | 473/521 |
| 5,322,249 A | * | 6/1994 | You ............................ | 264/516 |
| 5,624,115 A | * | 4/1997 | Baum ......................... | 473/567 |
| 6,302,812 B1 | * | 10/2001 | Perry ......................... | 473/535 |
| 6,319,159 B1 | | 11/2001 | Yu | |
| 2002/0037780 A1 | * | 3/2002 | York et al. .................. | 473/560 |
| 2002/0082098 A1 | * | 6/2002 | Lai Chuang ................. | 473/44 |

FOREIGN PATENT DOCUMENTS

| | | | | |
|---|---|---|---|---|
| DE | 200 19 249 | | 2/2001 | |
| GB | 2179263 A | * | 3/1987 | ........... A63B/49/14 |
| JP | 07051411 A | * | 2/1995 | ........... A63B/49/10 |
| JP | 2001-28967 | | 2/2001 | |

* cited by examiner

*Primary Examiner*—Charles T. Jordan
*Assistant Examiner*—Bret Hayes
(74) *Attorney, Agent, or Firm*—Browdy and Neimark, P.L.L.C.

(57) ABSTRACT

A hand net frame for the binding of a net to form a hand net, having a main body and a wooden covering layer covering at least one part of the main body, the main body having an annular head and a shaft extended outwards from the periphery of the head at one side, the head having a plurality of string holes for the binding of strings of the net, the head and the shaft being respectively formed of a roll of laminated fiber reinforced plastic sheet materials.

13 Claims, 4 Drawing Sheets

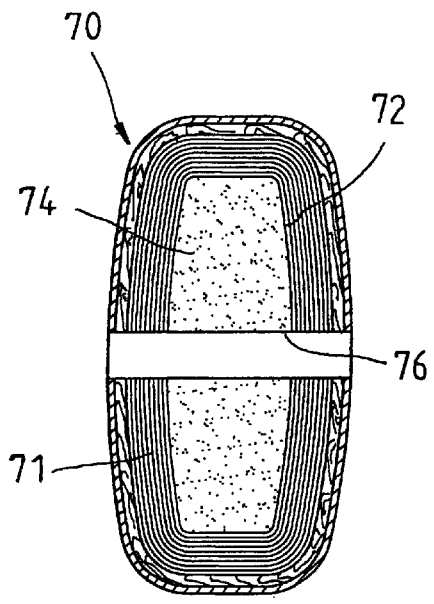
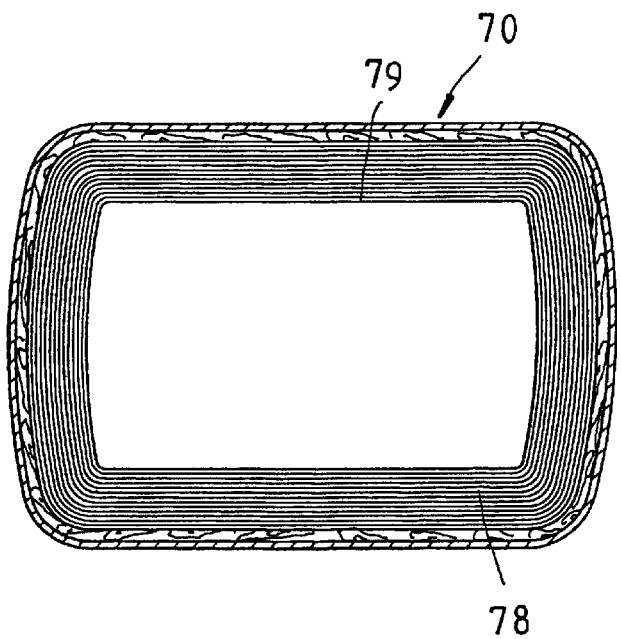
FIG.10   FIG.11
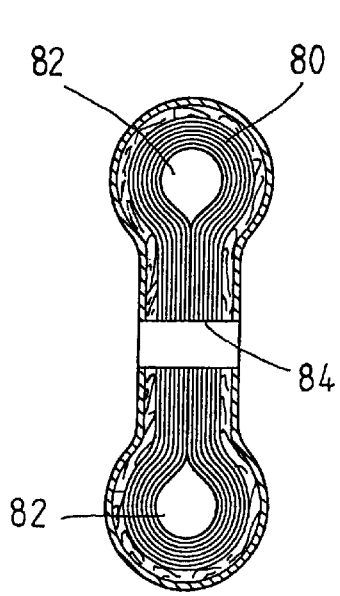
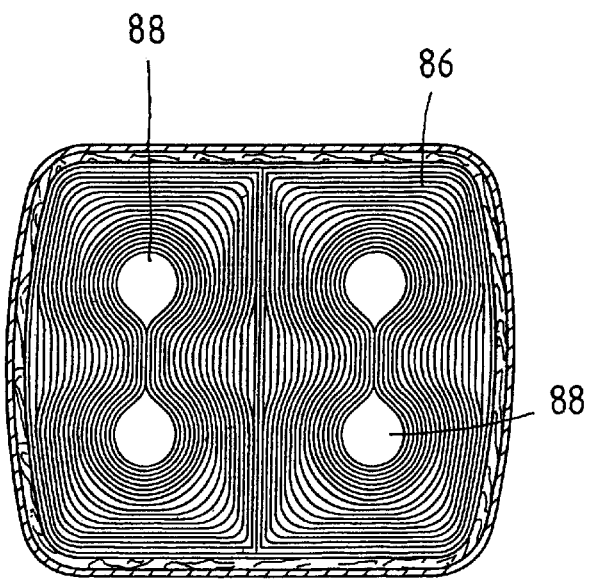
FIG.12   FIG.13

HAND NET FRAME

FIELD OF THE INVENTION

The present invention relates to a hand net and, more specifically, to a hand net frame, which has an outer appearance intimate to the nature that does not frighten the fish.

BACKGROUND OF THE INVENTION

A regular hand net is comprised of a hand net frame and a net suspended from the hand net frame. In early days, the hand net frame was made of wooden material. However, due to limited natural resources, metal and compound material, for example, fiber reinforced plastics are used instead of wood. These materials have a lightweight and high mechanical strength, however they have numerous drawbacks as outlined hereinafter.

1. Because regular metal and fiber reinforced plastic materials for hand net frame do not cause a sense of nature and tend to reflect light, the hand net tends to frighten the fish when used by the user to catch the fish.

2. Because regular metal and fiber reinforced plastic materials for hand net frame are cold and hard, hand net frames made of these do not cause a sense of beauty, affecting the consumers' willingness to use the hand nets.

3. Because hand net frames made of metal or carbon fiber reinforced plastic materials are electrically conductive and may produce static electricity, it is dangerous to use hand nets of these materials outdoors under a bad weather condition.

SUMMARY OF THE INVENTION

It is therefore the primary objective of the present invention to provide a hand net frame, which has a natural outer appearance that does not frighten the fish.

It is another objective of the present invention to provide a hand net frame, which has a good feeling when it is touched or seen by the user.

It is still another objective of the present invention to provide a hand net frame, which prevents the formation of static electricity.

To achieve these objectives of the present invention, the hand net frame is comprised of a main body, and a wooden covering layer covering at least one part of the main body. The main body comprises an annular head, and a shaft extended outwards from the periphery of the head at one side. The head provides with a plurality of string holes for the binding of strings of the net. Further, the head and the shaft are respectively formed of a roll of laminated fiber reinforced plastic sheet materials.

BRIEF DESCRIPTION OF THE DRAWINGS

FIG. 10 is a cross-sectional view of the head of the main body of a hand net frame according to a seventh preferred embodiment of the present invention.

FIG. 11 is a cross-sectional view of the shaft of the main body of the hand net frame according to the seventh preferred embodiment of the present invention.

FIG. 12 is a cross-sectional view of the head of the main body of a hand net frame according to an eighth preferred embodiment of the present invention.

FIG. 13 is a cross-sectional view of the shaft of the main body of the hand net frame according to the eighth preferred embodiment of the present invention.

DETAILED DESCRIPTION OF THE INVENTION

Figure 1:
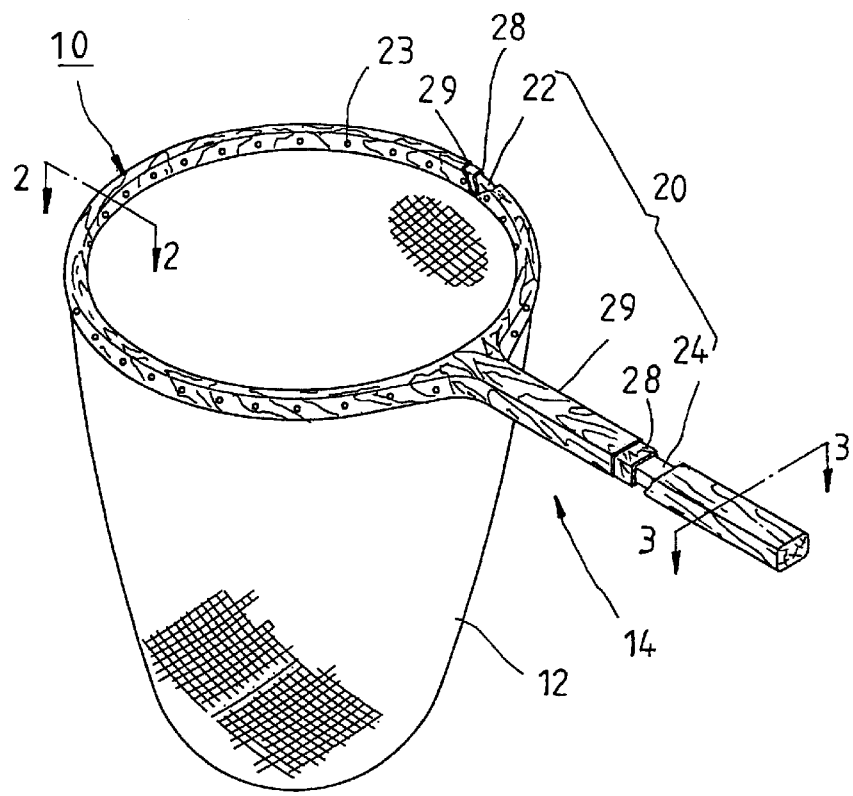
FIG. 1 illustrates a hand net frame fastened to a net according to a first preferred embodiment of the present invention.

Referring to FIGS. from 1 through 3, a hand net frame 10 of the first preferred embodiment is incorporated with a net 12, forming a hand net 14. The hand net frame 10 comprises a main body 20, a wooden covering layer 28, and a protective layer 29.

Figure 2:
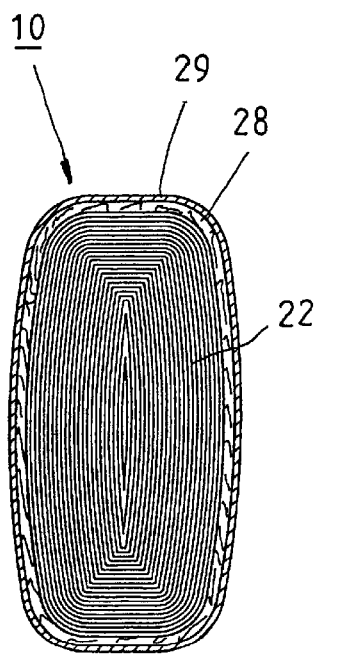
FIG. 2 is a sectional view in an enlarged scale taken along line 2—2 of FIG. 1.
Figure 3:
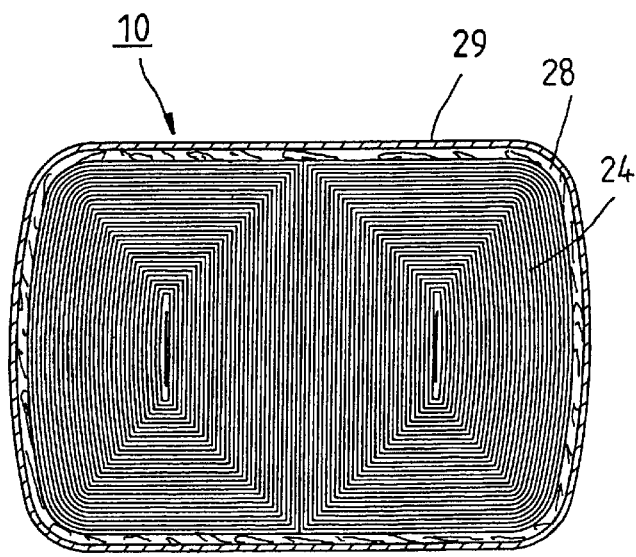
FIG. 3 is a sectional view in an enlarged scale taken along line 3—3 of FIG. 1.

The main body 20 comprises an annular head 22 and a shaft 24 extended outwards from the periphery of the head 22 at one side. The head 22 has string holes 23 for the binding of the strings of the net 12. The head 22 and the shaft 24 have a solid structure formed by rolling up laminated fiber reinforced plastic sheet materials into shape (see FIGS. 2 and 3). In fabrication, two ends of the bonded fiber reinforced plastic sheets of the head 22 are arranged in parallel and bonded together to form the shaft 24. In actual manufacturing process, the main body 20 can be made of fiber reinforced thermoplastic or thermosetting materials. Fiber materials can be selected from epoxy resin-coated carbon fibers, glass fibers, boron fibers, or high strength Kevlar (trade name) fibers.

The wooden covering layer 28 covers the whole surface of the main body 20. In fabrication, the wooden covering layer 28 is wound round the main body 20 and fixedly adhered to the surface of the main body 20. According to the present preferred embodiment, the thickness of the wooden covering layer 28 is about 0.1 mm. However, it is acceptable to have the thickness of the wooden covering layer 28 within the range of 0.05 mm~1.0 mm.

The protective layer 29 is made of transparent or semi-transparent fiber material, for example, non-woven fabric, fiber reinforced plastic film, or epoxy resin-coated fiberglass film, and covered over the whole surface of the wooden covering layer 28. The presence of the protective layer 29 protects the wooden covering layer 28 against impact of external objects, without keeping the color pattern of the wooden covering layer 28 from sight. The protective layer 29 may be eliminated for cost's sake.

Because the main body 20 of the hand net frame 10 is made of fiber reinforced plastic sheet materials, it has the advantages of lightweight and high mechanical strength.

The wooden covering layer 28 gives the sense of being intimate to the nature so as not to frighten the fish. Further, because the wooden covering layer 28 is electrically insulative, it prevents the formation of static electricity.

Figure 4:
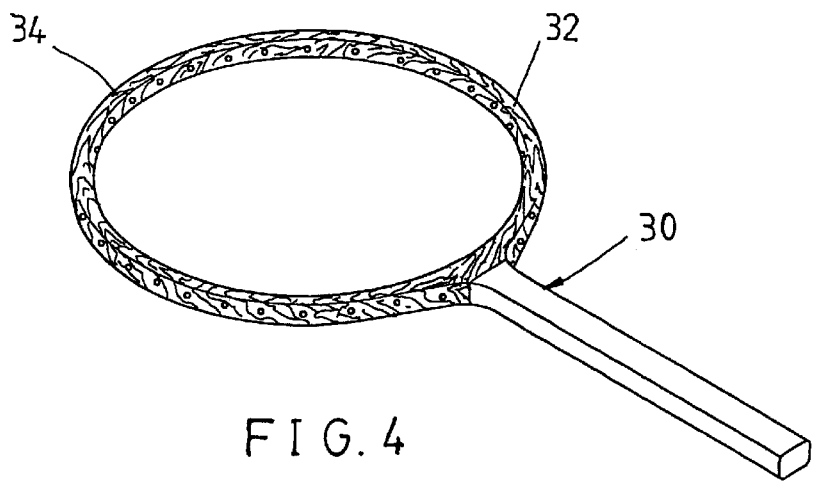
FIG. 4 is a perspective view of a hand net frame according to a second preferred embodiment of the present invention.
Figure 5:
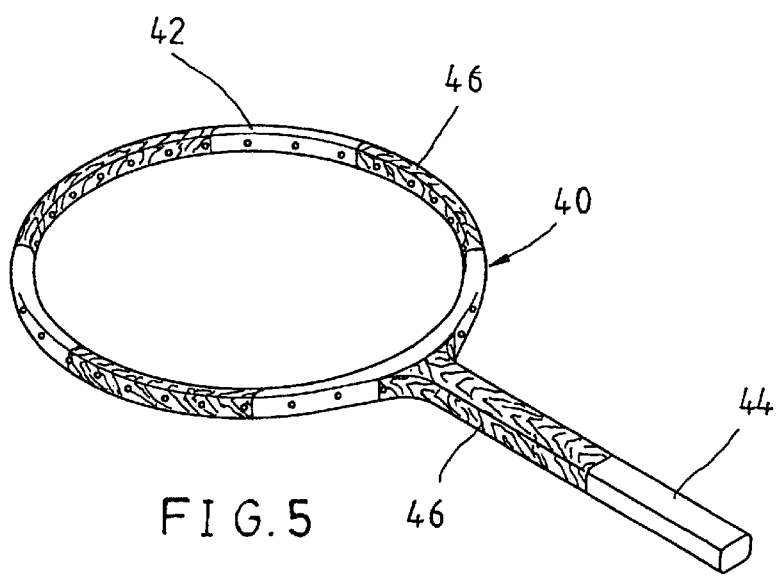
FIG. 5 is a perspective view of a hand net frame according to a third preferred embodiment of the present invention.
Figure 6:
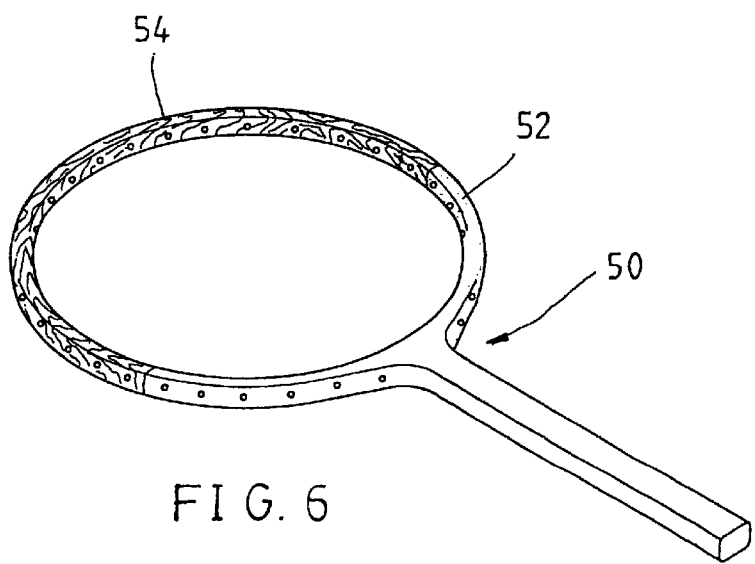
FIG. 6 is a perspective view of a hand net frame according to a fourth preferred embodiment of the present invention.

Referring to FIGS. from 4 through 6, the wooden covering layer may be variously embodied. In FIG. 4, the wooden covering layer 34 covers only the surface of the head 32. In FIG. 5, the wooden covering layer 46 is separated into four separated segments respectively covered on the head 42 of the main body 40 at different locations and a part of the shaft 44. In FIG. 6, the wooden covering layer 54 covers only the front half of the head 52 of the main body 50. In general, the wooden covering layer can be covered on the whole surface of the main body, or selectively covered on a part of the main body.

Figure 7:
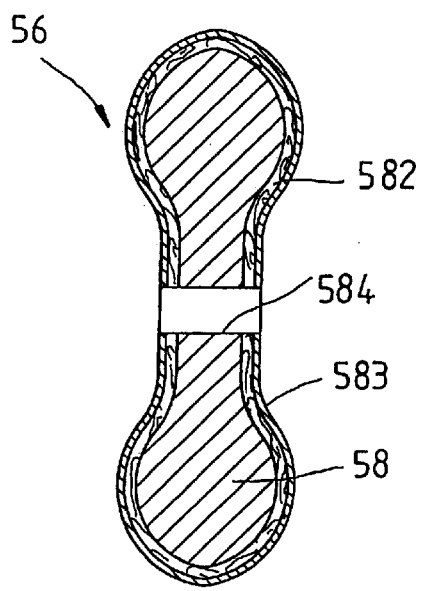
FIG. 7 is a cross-sectional view of the head of the main body of a hand net frame according to a fifth preferred embodiment of the present invention.

The main body of the hand net frame can also be variously embodied. As shown in FIG. 7, the head 58 of the main body 56 of a preferred embodiment of the present invention has a dumbbell-like cross section, i.e., the cross section of the head 58 has two rounded ends and a neck connected between the rounded ends. The head 58 of the main body 56 is covered with a wooden covering layer 582 and a protective layer 583 over the wooden covering layer 582, and the head 58 has a plurality of string holes 584. This design greatly diminishes the consumption of materials, and meets the requirement for lightweight.

Figure 8:
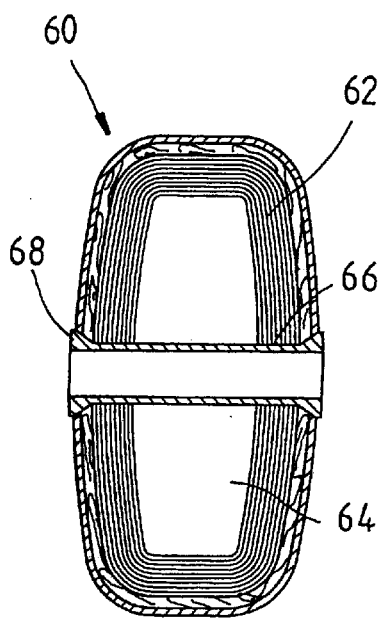
FIG. 8 is a cross-sectional view of the head of the main body of a hand net frame according to a sixth preferred embodiment of the present invention.
Figure 9:
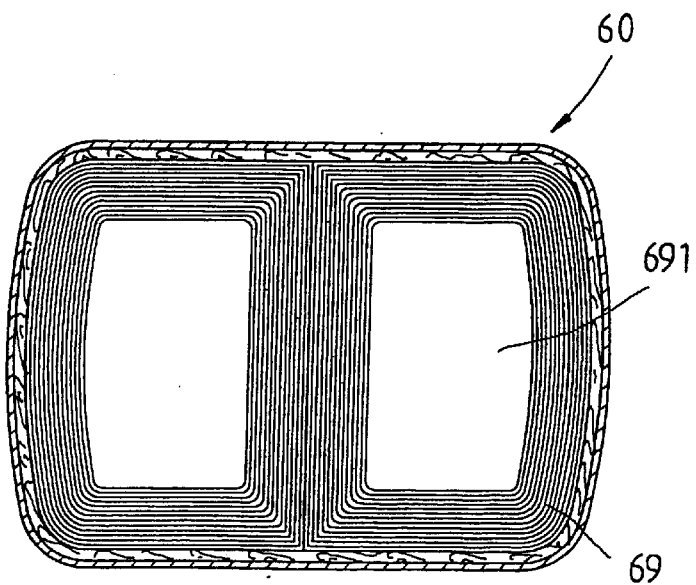
FIG. 9 is a cross-sectional view of the shaft of the main body of the hand net frame according to the sixth preferred embodiment of the present invention.

In FIG. 8, the head 62 of the main body of the hand net frame 60 is formed by fastening stacks of fiber reinforced plastic sheet materials together, defining a center chamber 64. This design also greatly diminishes the consumption of materials without affecting the structural strength of the hand net frame, and meets the requirement for lightweight. In order to prevent water from passing to the inside of the center chamber 64, gasket bushings 68 are respectively mounted in the string holes 66 before the installation of the strings of the net. FIG. 9 is a cross-sectional view of the shaft 69 of the main body of the hand net frame 60. In fabrication, two ends of the bonded fiber reinforced plastic sheets of the head 62 are arranged in parallel and bonded together, forming the shaft 69 having two chambers 691 respectively disposed in communication with the center chamber 64 of the head 62.

In FIG. 10, a core member 74 of foamed material, for example, foamed polyurethane is stuffed in the center chamber 72 of the head 71 of the main body of the hand net frame 70 so as to prevent water entering into the center chamber 72 through the string holes 76. FIG. 11 is a cross-sectional view of the shaft 78 of the main body of the hand net frame 70 of FIG. 10. In fabrication, only one end of the fiber reinforced plastic sheets of the head 71 is used to form the shaft 78 having a chamber 79 disposed in communication with the center chamber 72 of the head 71.

The head 80 of the main body of the hand net frame shown in FIG. 12 has a cross section shaped like a dumbbell, and two inside chambers 82, which are not in communication with the string holes 84 of the head 80. This design has a lightweight and strong structural strength, and effectively prohibits water from passing to the inside of the inside chambers 82 without the use of gasket bushings. Further, two ends of the bonded fiber reinforced plastic sheets of the head 80 are arranged in parallel and bonded together, forming the shaft 86 having four chambers 88 on the inside (see FIG. 13). In general, the head and shaft of the main body of the hand net frame can be made having a solid or hollow internal structure of any of a variety of shapes, with the outside wall covered with a wooden covering layer and then a protective layer on the wooden covering layer.

What is claimed is:

1. A hand net frame for the binding of a net to form a hand net, the frame comprising:

a main body having an annular head and a shaft extending outwards from the periphery of the annular head at one side, the annular head encircling an opening for the net coplanar with the shaft and having a plurality of string holes for the binding of strings of the net in the opening, the annular head and the shaft being a continuous roll throughout an entire length thereof of a plurality of laminated fiber reinforced plastic sheets shaped as the annular head and the shaft;

a wooden covering layer covering at least one part of the periphery of the annular head;

wherein the sheets form at least one chamber in an interior of the annular head; and wherein a foamed material fills the chamber in the interior of the annular head.

2. A hand net frame for the binding of a net to form a hand net, the frame comprising:

a main body having an annular head and a shaft extending outwards from the periphery of the annular head at one side, the annular head encircling an opening for the net coplanar with the shaft and having a plurality of string holes for the binding of strings of the net in the opening, the annular head and the shaft being a continuous roll throughout an entire length thereof of a plurality of laminated fiber reinforced plastic sheets shaped as the annular head and the shaft; and a wooden covering layer covering at least one part of the periphery of the annular head, wherein the sheets form a solid cross section through the main body.

3. The frame as defined in claim 1, wherein the shaft of the main body has two chambers respectively disposed in communication with the chamber of the annular head.

4. The frame as defined in claim 1, wherein the sheets produce two chambers in the interior of the annular head which do not communicate with said string holes.

5. The frame as defined in claim 4, wherein the shaft of the main body is provided in the interior thereof with four chambers respectively disposed in communication with the chambers of the annular head.

6. The frame as defined in claim 1, wherein said wooden covering layer covers the whole area of the periphery of said main body.

7. The frame as defined in claim 1, wherein said wooden covering layer has the thickness within 0.05 mm~1.0 mm.

8. The frame as defined in claim 1, wherein said main body is made of fiber reinforced thermoplastic sheets.

9. The frame as defined in claim 1, wherein said main body is made of fiber reinforced thermosetting sheets.

10. The frame as defined in claim 1, wherein said main body is made of fiber reinforced plastic sheets containing fibers selected from carbon fibers, glass fibers, and boron fibers.

11. The frame as defined in claim 1 further comprising a transparent protective layer covering a periphery of said main body and said wooden covering layer.

12. The frame as defined in claim 11, wherein said protective layer is made of non-woven fabrics.

13. The frame as defined in claim 11, wherein said protective layer is made of glass fiber reinforced plastics.

* * * * *